(12) United States Patent
Baldwin et al.

(10) Patent No.: US 7,827,317 B2
(45) Date of Patent: *Nov. 2, 2010

(54) APPARATUS FOR MANAGEMENT OF MIXED PROTOCOL STORAGE NETWORKS

(75) Inventors: Duane Mark Baldwin, Mantorville, MN (US); David Lynn Merbach, Rochester, MN (US); Gregory John Tevis, Tuscon, AZ (US)

(73) Assignee: International Business Machines Corporation, Armonk, NY (US)

( * ) Notice: Subject to any disclaimer, the term of this patent is extended or adjusted under 35 U.S.C. 154(b) by 381 days.

This patent is subject to a terminal disclaimer.

(21) Appl. No.: 12/100,251

(22) Filed: Apr. 9, 2008

(65) Prior Publication Data

US 2008/0183856 A1 Jul. 31, 2008

Related U.S. Application Data

(63) Continuation of application No. 10/132,656, filed on Apr. 25, 2002, now Pat. No. 7,398,326.

(51) Int. Cl.
G06F 15/16 (2006.01)
(52) U.S. Cl. ............... 709/249; 709/223; 709/224; 370/254; 370/353; 370/395.5; 370/395.72; 715/734; 715/735; 715/736
(58) Field of Classification Search .......... 709/249, 709/223, 224; 370/254, 353, 395.5, 395.72; 715/734, 735, 736
See application file for complete search history.

(56) References Cited

U.S. PATENT DOCUMENTS 5,684,967 A * 11/1997 McKenna et al. ........... 715/853
5,758,083 A * 5/1998 Singh et al. ................ 709/223
5,822,569 A   10/1998 McPartian et al.
5,848,243 A * 12/1998 Kulkarni et al. ............ 709/224
5,925,119 A   7/1999 Maroney
5,948,055 A * 9/1999 Pulsipher et al. ........... 709/202

(Continued)

FOREIGN PATENT DOCUMENTS

WO WO 00/77606 A2 12/2000

(Continued)

OTHER PUBLICATIONS

"Brocade Fibre Channel Connectivity Devices & Software," web page print-out from Promark Technolgy, http://www.promarktech.com/storage/connectivity/brocade/ downloaded on Oct. 16, 2001.

(Continued)

Primary Examiner—Dohm Chankong
(74) Attorney, Agent, or Firm—Kunzler Needham Massey & Thorpe

(57) ABSTRACT

The invention provides improvements on a digital data processing system of the type having a first set of hosts, storage devices or other components coupled for communication with a first network manager. A second set of components is likewise coupled to a second network manager. Communications between the network managers and their respective sets of components utilize different protocols, the first network manager referring to components of the first set with identifiers that are unique to those respective components under the first protocol, and the second network manager referring to components of the second set with identifiers that are unique to those respective components under the second protocol.

26 Claims, 2 Drawing Sheets

U.S. PATENT DOCUMENTS

| | | | |
|---|---|---|---|
| 6,141,680 A * | 10/2000 | Cucchiara | 709/201 |
| 6,151,331 A | 11/2000 | Wilson | |
| 6,199,112 B1 | 3/2001 | Wilson | |
| 6,205,122 B1 * | 3/2001 | Sharon et al. | 370/254 |
| 6,226,676 B1 | 5/2001 | Crump et al. | |
| 6,253,240 B1 * | 6/2001 | Axberg et al. | 709/223 |
| 6,256,322 B1 | 7/2001 | Wilson, Jr. | |
| 6,260,120 B1 | 7/2001 | Blumenau et al. | |
| 6,330,621 B1 | 12/2001 | Bakke et al. | |
| 6,377,987 B1 | 4/2002 | Kracht | |
| 6,400,730 B1 | 6/2002 | Latif et al. | |
| 6,430,614 B1 * | 8/2002 | Cucchiara | 709/223 |
| 6,446,141 B1 | 9/2002 | Nolan et al. | |
| 6,480,901 B1 | 11/2002 | Weber et al. | |
| 6,538,669 B1 | 3/2003 | Lagueux et al. | |
| 6,606,690 B2 | 8/2003 | Padovano | |
| 6,671,776 B1 | 12/2003 | DeKoning | |
| 6,683,883 B1 | 1/2004 | Czeiger et al. | |
| 6,725,264 B1 | 4/2004 | Christy | |
| 6,728,848 B2 | 4/2004 | Tamura et al. | |
| 6,748,429 B1 | 6/2004 | Talluri et al. | |
| 6,754,718 B1 | 6/2004 | Dobberpuhl et al. | |
| 6,833,850 B1 | 12/2004 | Arquie et al. | |
| 6,839,747 B1 | 1/2005 | Blumenau et al. | |
| 6,845,395 B1 | 1/2005 | Blumenau et al. | |
| 6,847,609 B1 | 1/2005 | Sarnikowski et al. | |
| 6,965,559 B2 | 11/2005 | Grabauskas et al. | |
| 6,985,956 B2 | 1/2006 | Luke et al. | |
| 7,072,986 B2 | 7/2006 | Kitamura et al. | |
| 7,106,751 B2 | 9/2006 | Miyamoto et al. | |
| 7,194,538 B1 * | 3/2007 | Rabe et al. | 709/224 |
| 7,203,730 B1 | 4/2007 | Meyer et al. | |
| 7,272,848 B1 | 9/2007 | Meyer et al. | |
| 7,685,261 B1 * | 3/2010 | Marinelli et al. | 709/220 |
| 2002/0138604 A1 | 9/2002 | Kopelovitz et al. | |
| 2002/0156883 A1 * | 10/2002 | Natarajan et al. | 709/224 |
| 2003/0061397 A1 | 3/2003 | Jacobs et al. | |
| 2003/0084219 A1 | 5/2003 | Yao et al. | |
| 2003/0088683 A1 | 5/2003 | Kitamura et al. | |
| 2003/0131105 A1 | 7/2003 | Czeiger et al. | |
| 2003/0131109 A1 | 7/2003 | Rosensteel et al. | |
| 2003/0140170 A1 | 7/2003 | Rosensteel et al. | |
| 2003/0145078 A1 | 7/2003 | Hubbard | |
| 2003/0145116 A1 | 7/2003 | Moroney et al. | |

FOREIGN PATENT DOCUMENTS

WO     WO 01/59966 A1     8/2001

OTHER PUBLICATIONS

"Products," web page print-out from Prisa Networks http://www.prisa.com/products.shtml, downloaded on Oct. 16, 2001.

Ellis, Paul, "Interoperability: The Big Word in Storage Today," http://www.Tivoli.com/products/documents/articles/interoperatibility.pdf, know about as early as Oct. 16, 2001.

"How to Plan for a Storage Area Network (SAN)," White Paper, 2000 High Ground Systems, Inc., know about as early as Oct. 16, 2001.

"Brocade Fibre Channel Connectivity Devices & Software," web page print-out from Promark Technolgy, http://www.promarktech.com/storage/connectivity/brocade/.

"Products," web page print-out from Prisa Networks http://www.prisa.com/products.shtml.

Ellis, Paul, "Ineroperabiliby: The Big Word in Storage Today," http://www.Tivoli.com/products/documents/articles/interoperatibility.pdf.

"How to Plan for a Storage Area Network (SAN)," White Paper, 2000 High Ground Systems, Inc.

Preslan, K.W. et al., "A 64-bit, Shared Disk File System for Linux," 16th IEEE Symposium on Mass Storage Systems, March 15-18, 1999, pp. 22-41.

* cited by examiner

APPARATUS FOR MANAGEMENT OF MIXED PROTOCOL STORAGE NETWORKS

CROSS-REFERENCE TO RELATED APPLICATIONS

This application is a continuation of U.S. patent application Ser. No. 10/132,656 filed on Apr. 25, 2002, now U.S. Pat. No. 7,398,326 entitled METHODS AND APPARATUS FOR MANAGEMENT OF MIXED PROTOCOL STORAGE AREA NETWORKS, and claims all rights of priority and incorporation available due to this continuation relationship.

BACKGROUND OF THE INVENTION

The invention pertains to digital data processing and, more particularly, to networks and methods of operation thereof. The invention has application, for example, in managing mixed-protocol or heterogeneous storage area networks.

In early computer systems, long-term data storage was typically provided by dedicated storage devices, such as tape and disk drives, connected to a data central computer. Requests to read and write data generated by application programs were processed by special-purpose input/output routines resident in the computer operating system. With the advent of "time sharing" and other early multiprocessing techniques, multiple users could simultaneously store and access data—albeit only through the dedicated storage devices.

With the rise of the personal computer (and workstation) in the 1980's, demand by business users led to development of interconnection mechanisms that permitted otherwise independent computers to access data on one another's storage devices. Though computer networks had been known prior to this, they typically permitted only communications, not storage sharing.

The prevalent business network that has emerged is the local area network, typically comprising "client" computers (e.g., individual PCs or workstations) connected by a network to a "server" computer. Unlike the early computing systems in which all processing and storage occurred on a central computer, client computers usually have adequate processor and storage capacity to execute many user applications. However, they often rely on the server computer—and its associated battery of disk drives and storage devices—for other than short-term file storage and for access to shared application and data files.

An information explosion, partially wrought by the rise of the corporate computing and, partially, by the Internet, is spurring further change. Less common are individual servers that reside as independent hubs of storage activity. Often many storage devices are placed on a network or switching fabric that can be accessed by several servers (such as file servers and web servers) which, in turn, service respective groups of clients. Sometimes even individual PCs or workstations are enabled for direct access of the storage devices (though, in most corporate environments such is province of server-class computers) on these storage area networks or SANs.

To date, most of the focus of SAN management has been on providing solutions for networks that operate under the fiber channel protocol (FCP). However, storage area devices that operate under different protocols, notably, SCSI-like storage devices that operate under the Internet Protocol (IP), are becoming increasingly popular. The disparity of these protocols and components operating under them presents a challenge for network management, which is only further complicated by the existence of devices (such as gateway) that themselves may operate under multiple protocols.

SUMMARY OF THE INVENTION

The foregoing are among the objects attained by the invention which provides, in one aspect, improvements on a digital data processing system of the type having a first set of hosts, storage devices or other components coupled for communication with a first network manager. A second set of components is likewise coupled to a second network manager. Communications between the network managers and their respective sets of components utilize different protocols. Correspondingly, the first network manager refers to components of the first set with identifiers that are unique (at least with respect to the first set) under the first protocol, while the second network manager refers to components of the second set with identifiers that are unique (at least with respect to the second set) under the second protocol.

The improvement is characterized in that the second network manager transmits to the first network manager information regarding at least one component in the second set and providing with that information an identifier of the type used by the first network manager in referring to components of the first set. That identifier coincides with an identifier of a component in the first set if that component is in both sets.

By way of example, the first set of components can be hosts and/or storage devices of an Internet Protocol (IP) network or, more particularly, of an IP storage area network (SAN). Conversely, the second set of components can be hosts and/or storage devices of a fiber channel protocol (FCP) network or, more particularly, of a fiber channel protocol SAN. The first network manager can be an IP network manager and the second network manager can be a FCP network manager, each addressing the components of its respective network by IP addresses and FCP identifiers, respectively. The second network manager can transmit to the first network manager information regarding a storage device or other component FCP SAN. Along with that information, it can provide an IP address of that FCP device or component. The IP network manager can compare that address with those of components in the IP network to see whether the specific component of the FCP network also resides on the IP network Further aspects of the invention provide a digital data processing system as described above in which the first network manager manages components in the second set, e.g., through the second network manager. Continuing the example, in a system according to this aspect of the invention, the IP manager utilizes information supplied by the FCP manager—including, for example, the IP addresses of the FCP network components—to manage the FCP SAN.

Related aspects of the invention provide a system as described above wherein an administrator or other console is coupled with the first network manager, e.g., the IP network manager in the example, which uses that console to display information regarding components of the second set.

Related aspects of the invention provide systems as described above in which components that are common to both networks are identified, e.g., through color, iconography, and so forth. Thus, for example, where the IP network manager generates a topological display of the IP network and, using information supplied by the FCP network managers, a topological display of the IP network, color or icons can be used to denote components that are members of both networks.

Further aspects of the invention provide systems as described above in which the IP network includes iSCSI devices, as well as conventional (or non-iSCSI) devices. The first network manager generates a topological or other display of the IP network highlighting or otherwise indicating which devices are iSCSI devices.

Still further aspects of the invention provide methods the paralleling the operations described above.

These and other aspects of the invention are evident in the drawings and in the detailed description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
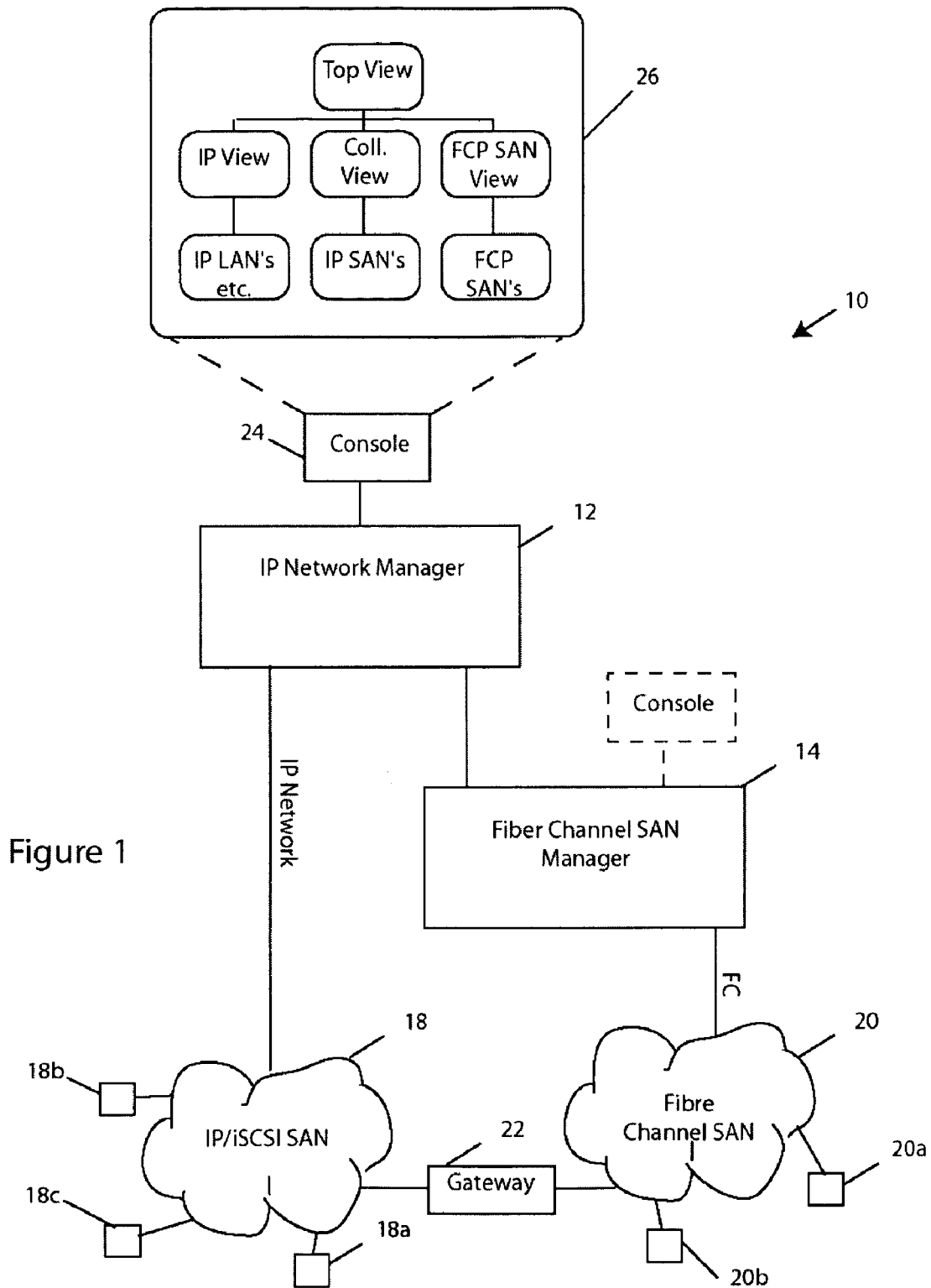
FIG. 1 depicts a digital data processing system 10 according to the invention with improved management of heterogeneous networks.

FIG. 1 depicts a digital data processing system 10 according to the invention with improved management of mixed-protocol or heterogeneous networks. The system 10 includes a first network manager 12, a second network manager 14, a first storage area network 18, a second storage area network 20, and a console 24, all coupled for communication as shown.

Illustrated storage area network (SAN) 18 is an IP network. Thus, it includes one or more components 18a-18c that (i) communicate via the Internet protocol or IP over a LAN, WAN, Internet or other network medium 18 operating or carrying information in accord with that standard and (ii) are referenced by an IP address that is unique to each component on that network 18. The components typically include storage devices, such as disk drives and arrays, of the type conventionally used in storage area networks, though any variety of storage devices may be used for this purpose. The components may also include one or more hosts, such as web servers, file servers and/or other digital data devices (including, for example, mainframe computers, workstations, personal computers, and so forth) that access and/or store (collectively, "access") information on the storage devices.

Illustrated storage area network 20 is fiber channel network. Thus, it includes one or more components 20a-20b that (i) communicate via the fiber channel protocol or FCP over a fiber channel fabric or other network medium 20 operating or carrying information in accord with that standard and (ii) are referenced by an FCP identifier that is unique on that fabric 20). As above, the components typically include storage devices, such as disk drives and arrays, of the type conventionally used in storage area networks, though any variety of storage devices may be used for this purpose. And, as above, the components may also include one or more hosts, such as web servers, file servers and/or other digital data devices (including, for example, mainframe computers, workstations, personal computers, and so forth), all that access and/or store (collectively, "access") information on the storage devices.

The networks 18, 20 may include components other than those discussed above. For example, they may incorporate communication devices (e.g., modems), routers and switching devices, and other elements commonly known in the art.

In this regard, for example, illustrated networks 18, 20 share a gateway 22 that is used to transfer information therebetween.

The network managers 12, 14, storage area networks 18, 20, and their constituent components, are configured and operated in the conventional manner known in the art, as adapted in accord with the teachings here. Though networks 18, 20 of the illustrated embodiment are storage area networks operating under IP and FCP protocols, respectively, it will be appreciated that the invention can be practiced with networks of other types and operating under other protocols. Such networks 18, 20 will typically operate under different protocols (e.g., IP versus FCP). However, the invention may also be applied to individual (or multiple) networks that support components operating under different protocols. It is in all these regards that the terms "mixed-protocol" and "heterogeneous" are used.

Illustrated network manager 12 provides administrative services with respect to SAN (or other network) 18. This includes network component discovery, topology reporting, event monitoring, device manager launching and/or network configuration (including, for example, assigning identifications to components 18a-18d and assigning components to hosts), all in the conventional manner known in the art with respect to components of network 18. To this end, network manager references the components 18a-18c by their respective IP addresses for purposes of addressing or identification. The illustrated network manager 12 executes on a general purpose or server workstation; though it may be implemented on any general or special purpose digital data processing device known in the art.

Network manager 14 provides like services with respect to SAN (or other network) 20, all in the conventional manner known in the art with respect to components of network 20. To this end, network manager 14 references the components 20a-20b by their respective FCP addresses for purposes of addressing or identification. It also executes on a general purpose or server workstation, though, it may also be implemented on any general or special purpose digital data processing device known in the art. The network manager 14 can, but need not, be embodied in the same digital data processing device as network manager 12.

The console 24 facilitates access by a user or system administrator (hereinafter, "administrator") to the network manager 12. This is typically a personal computer or workstation and, indeed, may be the same device in which one or both network managers 12, 14 are embodied. In addition to a processor, the console 24 comprises a display, keyboard and/or other input/output devices (such as a mouse and printer). Other human machine interface (HMI) devices of the variety known in the art may be used in addition or instead (e.g., personal digital assistants, teletype terminals, touch pads, and so forth).

Network manager 12 utilizes a graphical user interface (GUI) to drive information to the console 24 and/or collect information therefrom. For example, the manager 12 employs the GUI to present a topological display of associated network 18 on the console 24. The GUI can likewise be used to present and collect information in regard the provisioning of other services by network manager 12 with respect to network 18.

Though reference is made throughout to a graphical user interface, those skilled in the art will appreciate that this embraces non-graphical (e.g., textual or voice-synthesized) interfaces of the type commonly used instead or in addition to graphical displays.

A separate console (illustrated with dashed lines) can be provided to present and collect information with respect to the provisioning of services by network manager 14 vis-a-vis network 20. However, in the illustrated embodiment, the provisioning of one or more of those services takes place through network manager 12—put another way, the provisioning of one or more services with respect to network 20 by network manager 14 takes place through network manager 12. Correspondingly, information presentation and collection with respect to those services is provided through console 24.

This makes possible management of network 20 through network manager 12 and, more generally, administration of the networks 18, 20 as a single, albeit heterogeneous network. By way of non-limiting example, this facilitates (i) generating displays on console 24 of the combined topologies and components of SANs 18 and 20, and (ii) identifying components (such as gateway 22) shared by both networks 18, 20 and generating topological or other displays highlighting such components.

In the illustrated embodiment, network manager 12 comprises the commercially available Tivoli® NetView®, which provides native management of IP networks such as network 18. The network manager 14 of the illustrated embodiment is a fiber channel network manager of the type disclosed in copending, commonly assigned U.S. application Ser. No. 09/972,584, entitled "Storage Area Network Methods And Apparatus With Centralized Management," filed Oct. 5, 2001, the teachings of which are incorporated herein by reference. Other network managers, whether commercially available or otherwise, capable of providing services with respect to networks 18, 20 may be used in addition or instead.

The fiber channel network manager 14 communicates with the IP network manager 12 via a published applications program interface (API) of the latter. Through that API, requests pertaining to network 20 initiated in network manager 12—or, more typically, by an administrator at console 24—are passed from network manager 12 to network manager 14. Likewise, responses, notifications and other information pertaining to network 20 generated by network manager 14 are passed to network manager 12, where they are integrated with information generated by network manager 12 for pertaining to network 18 and displayed on the console 24.

More particularly, according to one embodiment of the invention, network managers 12, 14 interface with one another for the aforementioned purposes in the manner disclosed in the incorporated-by-reference application at FIGS. 6 and 38-40, and the accompanying text, including, by way of non-limiting example, the sections entitled SAN Manager Console and User Interface Architecture, all of which are incorporated herein by reference.

According to those teachings, a daemon provides functions allowing the network manager 12 to interface with the network manager 14. These includes, for example, retrieval of the topology of SAN 20 from the Network manager 14, mapping a retrieved topology map into sub-maps, and handling action callbacks. Incorporated-by-reference FIGS. 6 and 38 of the aforementioned application illustrate and discuss the functional components used to provide those functions. Incorporated-by-reference FIGS. 39-40 depict an exemplary information flow among those components when a user, e.g., the administrator, issues a refresh topology directive from the console 24 and when new topology data is transmitted from the network manager 14 to the network manager 12 for presentation to the administrator.

Those skilled in the art will, of course, appreciate that other mechanisms, e.g., based on NetView® API and/or other communications mechanisms, can be used to pass requests, responses, notifications and other information between the network managers for purposes of provisioning services with respect to network 20 by network manager 14 through network manager 12.

Components of FCP networks (e.g., FCP network 20) are conventionally associated only with FCP identifiers, which cannot be used by IP network managers (such as IP manager 12), e.g., to identify components that are members of both networks 18, 20 and, more generally, to administer the disparate networks 18, 20 as a single heterogeneous network.

The illustrated embodiment overcomes this by finding, for each component in FCP network 20, an identifier by which that component can be compared with components in IP network 18, thereby, facilitating identification of components that are common to both networks 18, 20 (and, more generally, facilitating administration of the networks as a single heterogeneous network) Here, that identifier is the IP address of each respective component of FCP network 20. In other embodiments, it may be other IP-related addresses or identifiers with which such comparisons can be made. Of course, in embodiments where network 18 is based on a protocol other than IP, an address or identifier associated with that other protocol may (but need not necessarily) be used instead.

The FCP network manager 14 of the illustrated embodiment is responsible for finding (or assigning) an IP identifier for each component (or at least, for example, components that have native IP interfaces, e.g., gateways, storage subsystems and so forth) in FCP network 20. In the case of FCP components that include support for Simple Network Management Protocol (SNMP), the FCP network manager 14 obtains an IP address from the Fabric Element management information base (MIB), in the case of switch-type components, or the Fiber Channel Management MIB, for other types of components. The former is used in the case of switches or switching components; the latter, for components of other types.

To the extent any of the components on FCP network 20 have such MIBs, they can be queried for the associated IP addresses in any manner known in the art. One mechanism is the issuance of SNMP requests on a separate IP network (not shown) that couples the network manager 14 to those components. Another mechanism is the use of agents to gather host-type and storage device-type status/configuration information in the manner of the "outband discovery" discussed in the aforementioned incorporated-by-reference application.

For legacy and other FCP components that make up a large part, if not entirety, of many FCP networks 20 and that do not support the SNMP protocol nor have MIBs, the FCP network manager 14 can assign an IP address that is based on a unique and/or common identifier, e.g., contained on the Device Identification Page (83h) of the FCP component. In the illustrated embodiment, however, the manager 14 looks to the administrator for that IP address. This can be by reference to information previously obtained by the manager 14 from the administrator at the time the component was installed in the fabric 20 or by subsequently (re)querying the administrator for such an address. IP addresses for each of the components in FCP network 20 can be stored by manager 14 with other status information for those components, e.g., in a persistent or other database maintained by the manager 20.

Whether obtained from a MIB or from the administrator (or otherwise), the FCP manager 14 provides the IP address (or other IP identifier) of each component in FCP network 20 to the manager 12. This is typically provided, along with the FCP identifier of each component and any other relevant status or identifying information, for example, in response to a refresh topology directive issued from the console 24 and/or directly from the manager 12 itself (e.g., in connection with rebuilding any internal topology models).

The IP manager 12 can utilize the aforementioned status and identifying information of each component of in FCP network 20 to generate topological and other displays of the components of that network in the conventional manner. Such displays can be generated concurrently with those representing the components of IP network 18 otherwise generated by the IP network manager 12 in the conventional manner, e.g., to provide a display of a single heterogeneous network. In these regards, it will be appreciated that IP network manager 12 and FCP network manager 14 can operate in the conventional manner to discover the componentry of the respective networks (again, of course, with network manager 12 relying on network manager 14 for information discovered by the latter with respect to its respective network 20).

As a consequence of inclusion, by FCP network manager 14, of IP addresses (or other IP identifiers) for each component of network 20, the network manager 12 has additional display and/or management capabilities. Notably, referring by way of example to FIG. 2A, the network manager can compare IP addresses of the components identified by it in network 18 with those identified by FCP manager 14 in network 20 in order to discern components shared by both network. Those components can be highlighted, e.g., by way of color, brightness, text, icons or otherwise in composite topological displays generated by IP network manager 12 of the combined network topologies.

Figure 2A:
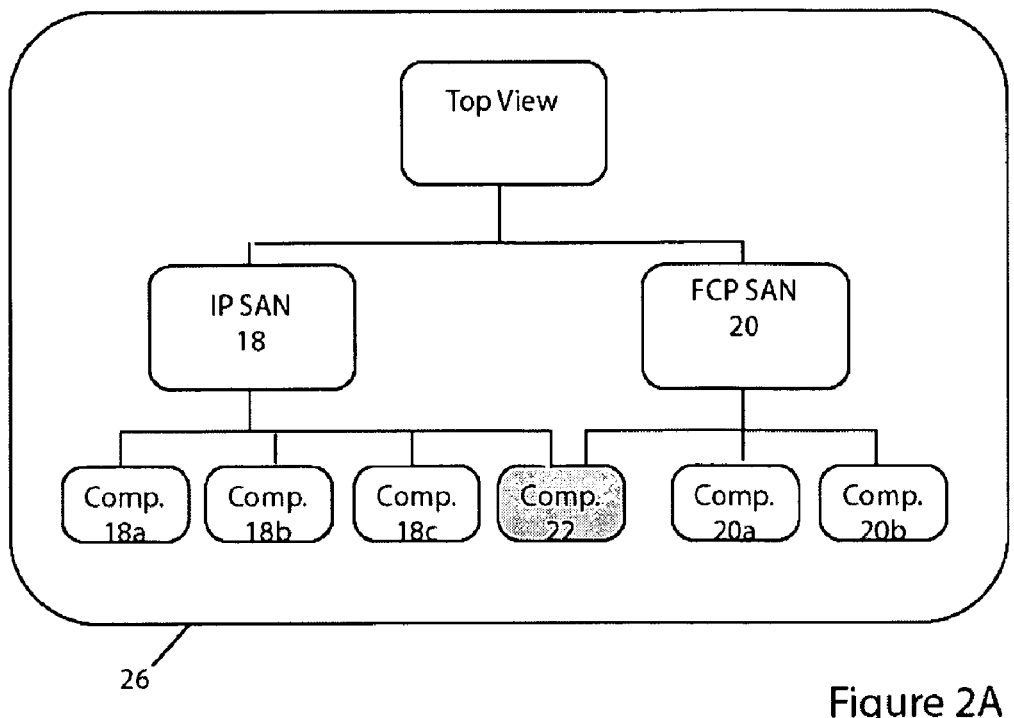
FIG. 2A depicts a display of the type generated by a network manager in a system according to the invention showing the topology of first and second networks and highlighting components shared by them.

An example of this is shown in FIG. 2A. Depicted there is a display 26 of the type presented by network manager 12 on console 24 showing components 18a-18c as part of IP network 18, while showing components 20a-20b as part of FCP network 20. Gateway 22, which is part of both network, is identified as such by IP network manager 12, which compares the IP address of that component as supplied by FCP network manager 14 with that discerned by IP manager 12 itself during its discovery of the componentry of IP network 18. A favorable comparison indicates that the component is one in the same and is accordingly highlighted in the display 26.

Of course, the IP network manager 12 can make additional use of the capability to discern components shared by both networks 18, 20. For example, in a topological display of a single one of the networks 18 or 20, the network manager 12 can respond to a user request (e.g., double-clicking or selecting of a highlighted component) to change to a topology display of the other network containing that element. As a consequence of this and other uses of the added capability that will be evident to those skilled in the art, the IP network manager facilitates management of the heterogeneous network formed by networks 18, 20.

As noted above, networks 18, 20 can be of other types and can operate under other protocols. In one such example, network 18 might be an FCP network and network 20 an IP network (i.e., just the opposite of the configuration shown in the drawings and discussed above). In such an example, the manager of the FCP network (e.g., manager 12) could manage the IP network, e.g., via its network manger 14, by application of the same mechanisms discussed above. Identifiers other than IP addresses could be used, in such an example, to facilitate comparison of network components, e.g., for purposes of determining which components are shared between them.

As noted above, IP network manager 12 can discover the componentry of IP network 18 and to generate displays thereof in the conventional manner (with the added capability of highlighting components shared between networks). Illustrated network manager 12 has the additional capability to discover and, for example, separately display iSCSI components on the IP network. To this end, it uses the SNMP protocol to query the iSCSI MIB associated with each component 18a-18c on that network to determine if (in addition to being an IP device) it is an iSCSI device, as indicated by an iSCSI instance number greater than zero in the respective component's MIB. If the querying this variable produces no response, or a value of zero, the device is assumed not to be an iSCSI device.

Figure 2B:
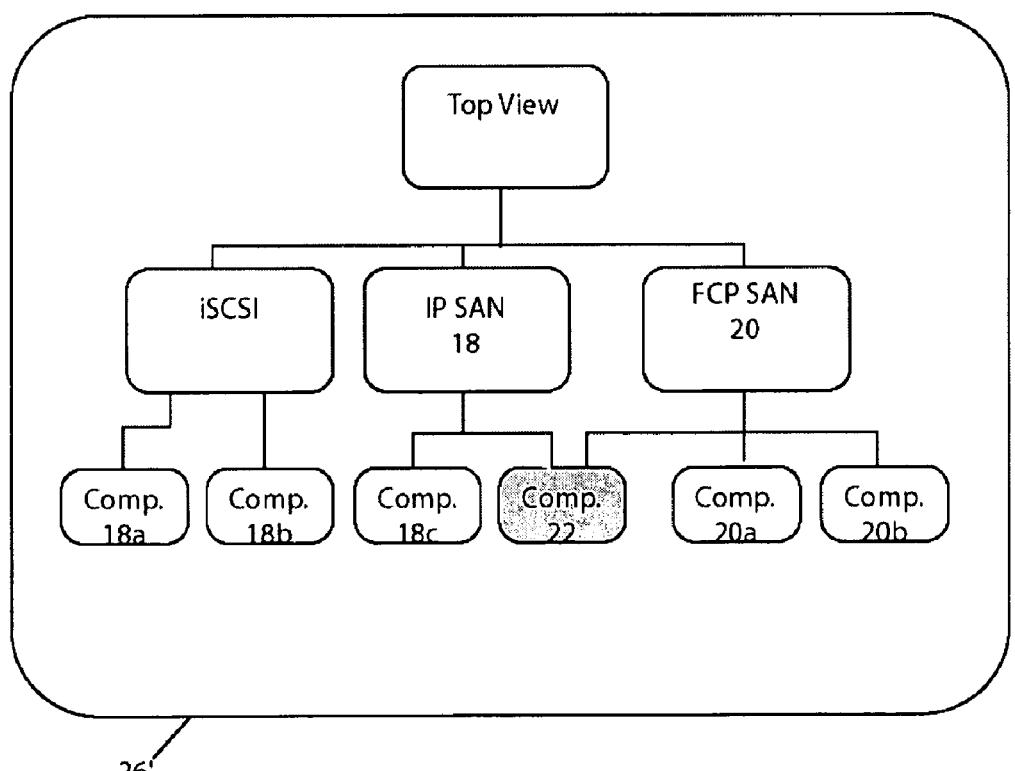
FIG. 2B depicts a display like that of FIG. 2A that additionally calls out iSCSI elements of the first network.

Components identified as iSCSI devices in this manner can be displayed separately from the other components of network 18, e.g., in the manner of "smart set" items in a NetView® display. An example of this is presented in FIG. 2B, which mirrors FIG. 2A except insofar as it shows components 18a-18b as part as iSCSI devices on network 18.

Described above are improved systems for management of heterogeneous networks, e.g., networks formed from IP SAN and FCP SAN portions and/or in which an IP SAN includes both conventional IP and iSCSI devices. It will be appreciated that the drawings and accompanying text describe only some embodiments of the invention, and that others incorporating modifications to those disclosed here fall within the scope of the invention, of which we claim:

The invention claimed is:

1. A digital data processing system for managing mixed protocol storage area: networks, the digital data processing system comprising:

a first component set, comprising one or more components coupled for communication with a first network manager via a first protocol, the first network manager managing the one or more components and identifying each of the one or more components in the first component set with an identifier of a first identifier type, the identifier being unique to that component under that protocol with respect to the other components in the first component set, a second component set, comprising one or more components coupled for communication with a second network manager via a second protocol, the second network manager managing the one or more components and identifying each of the one or more components in the second component set with an identifier of a second identifier type, the identifier being unique to that component under the second protocol with respect to the other components in the second set, wherein the first and second protocols differ, and the second network manager is coupled with the first network manager and transmits to the first network manager information regarding at least one component in the second component set, wherein the second network manager provides with the information an identifier of the first identifier type for each of the components of the second component set for which information is transmitted by the second network manager, and for a common component that is common to the first component set and the second component set, the second network manager transmits an identifier of the first identifier type that matches an identifier of the first identifier type used by the first network manager to identify the common component.

2. The digital data processing system of claim 1, wherein the first network manager facilitates management of components of the second component set.

3. The digital data processing system of claim 1, wherein the first network manager compares the identifier provided with the information regarding the at least one component of the second component set with identifiers of the components in the first components set to determine if the component of the second component set is also in the first component set.

4. The digital data processing system of claim 2, comprising a console that is coupled with the first network manager, the first network manager generating a display for application to the console that represents one or more components of the second component set.

5. The digital data processing system of claim 3, wherein the first network manager generates the display to identify one or more components of the second component set that are also components of the first component set.

6. The digital data processing system of claim 1, wherein the first protocol is an internet protocol (IP) and the second protocol is a fiber channel protocol (FCP).

7. The digital data processing system of claim 6, wherein the identifiers of the first identifiers type are IP addresses and the identifiers of the second identifier type are FCP identifiers.

8. The digital data processing system of claim 1, wherein the components of the first component set and the second component set comprise any of host devices and storage devices.

9. The digital data processing system of claim 1, wherein at least one of the first component set and the second component set comprises a storage area network.

10. The digital data processing system of claim 9, wherein the first component set comprises an IP storage area network and the second component set comprises an FCP storage area network.

11. A heterogeneous networked digital data processing system comprising:
- a first network comprising one or more components coupled for communication under a first protocol,
- a second network comprising one or more components coupled for communication under a second protocol that differs from the first protocol,
- a first network manager coupled to the first network, the first network manager managing the one or more components of the first network and identifying one or more components of the first network with identifiers compatible with the first network,
- a second network manager coupled to the first network manager and to the second network, the second network manager
  - managing the one or more components of the second network,
  - identifying one or more components of the second network with identifiers compatible with the first network,
  - identifying a common component that is common to the first network and to the second network and assigning the common component an identifier that is the same as an identifier used by the first network manager to identify the common component within the first network,
  - transmitting information to the first network manager regarding at least one component of the second network, and
  - transmitting to the first network manager, along with the information, the associated component identifiers which are compatible with the first network, and
- the first network manager identifying from the transmitted information and identifiers from the second network manager one or more common components on the second network that are also on the first network.

12. A heterogeneous networked digital data processing system according to claim 11, wherein the first protocol is an internet protocol (IP) and the second protocol is a fiber channel protocol (FCP).

13. A heterogeneous networked digital data processing system according to claim 12, wherein the first network manager identifies each component in the first network with an IP address and the second network manager identifies each component in the second network with an FCP identifier and a corresponding IP address.

14. A heterogeneous networked digital data processing system according to claim 13, wherein the first network manager facilitates management of components of the second network.

15. A heterogeneous networked digital data processing system according to claim 13, wherein the first network manager compares the IP address provided with the information from the second network manager regarding a component of the second network to determine if the component is also in the first network.

16. A heterogeneous networked digital data processing system according to claim 15, comprising
- a console that is coupled to the first network manager,
- the first network manager generating a display for application to the console that includes one or more components of the second network.

17. A heterogeneous networked digital data processing system according to claim 16, the further improvement wherein the first network manager generates the display to identify one or more components of the second set that are also components of the first set.

18. A heterogeneous networked digital data processing system comprising:
- a first network comprising one or more components coupled for communication under a first protocol,
- a second network comprising one or more components coupled for communication under a second protocol that differs from the first protocol,
- a first network manager coupled to the first network, the first network manager managing the one or more components of the first network and identifying the one or more components of the first network using identifiers of a first identifier type, each identifier being compatible with the first protocol and being unique to each of the one or more components of the first network,
  - the first network manager communicating with the one or more components on the first network using the identifiers of the first identifier type and the first protocol,
- a second network manager coupled to the second network and identifying the one or more components of the second network using identifiers of a second identifier type, the second network manager managing the one or more components of the second network, each identifier of the second identifier type being compatible with the second protocol and being unique to each of the one or more components of the second network and communicating with the one or more components on the second network using the identifiers of the second type and the second protocol,
- the second network manager coupled to the first network manager transmitting to the first network manager information regarding at least one component of the second network to the first network manager, the second network manager providing with the information an identifier of the first identifier type for the least one component of the second network, and wherein the second network manager provides an identifier for a common component, that is common to the first component set and to the second component set, that matches an identifier of the common component in the first network, and the first network manager identifying, from the transmitted information and associated identifiers, one or more common components that are on the second network and also on the first network.

19. A heterogeneous networked digital data processing system according to claim 18, wherein the first protocol is an internet protocol (IP) and the second protocol is a fiber channel protocol (FCP).

20. A heterogeneous networked digital data processing system according to claim 19, wherein the identifiers of the first identifier type are IP addresses and the identifiers of the second identifier type are FCP identifiers.

21. A heterogeneous networked digital data processing system according to claim 20, wherein the first network manager manages components of the second network.

22. A heterogeneous networked digital data processing system according to claim 20, wherein the first network manager compares the identifier of the first type provided with information regarding a component of the second network to determine if a component of the second set is also in the first network.

23. A heterogeneous networked digital data processing system according to claim 22, comprising
a console that is coupled with the first network manager,
the first network manager generating a display for application to the console that represents one or more components on the second network.

24. A heterogeneous networked digital data processing system according to claim 23, the further improvement wherein the first network manager generates the display to identify one or more components of the second network that are also components of the first network.

25. A heterogeneous networked digital data processing system according to claim 23, wherein the first network manager generates the display to include one or more components of the first network.

26. A heterogeneous networked digital data processing system according to claim 23, wherein the first network manager generates the display to identify components on the first network that are iSCSI components.

\* \* \* \* \*